(No Model.) 2 Sheets—Sheet 1.

J. F. JANSSEN.
WIND TURBINE.

No. 551,165. Patented Dec. 10, 1895.

Witnesses:

Inventor:
Johann Fimmen Janssen
by Gerson & Sachse
his Attorneys.

(No Model.) 2 Sheets—Sheet 2.

J. F. JANSSEN.
WIND TURBINE.

No. 551,165. Patented Dec. 10, 1895.

Witnesses:
Ferdinand Robitzsch
Hermann Jurenz

Inventor:
Johann Fimmen Janssen
by Gerson & Sachse
his Attorneys.

UNITED STATES PATENT OFFICE.

JOHANN FIMMEN JANSSEN, OF KÖPPERHÖRN, GERMANY.

WIND-TURBINE.

SPECIFICATION forming part of Letters Patent No. 551,165, dated December 10, 1895.

Application filed June 1, 1895. Serial No. 551,398. (No model.)

*To all whom it may concern:*

Be it known that I, JOHANN FIMMEN JANSSEN, a subject of the Emperor of Germany, residing at Köpperhörn, near Wilhelmshaven, in the Empire of Germany, have invented a new and useful wind-turbine with two or more wind-blades and an adjustable sheet-iron plate for regulating the turbine, of which the following is a specification.

The present invention is a wind-turbine by which the wind beyond the range of the wind-wings is led toward them by conducting-blades, so that a very great utilization of the wind is attained.

This wind-turbine is shown on the accompanying drawings.

Figure 1:
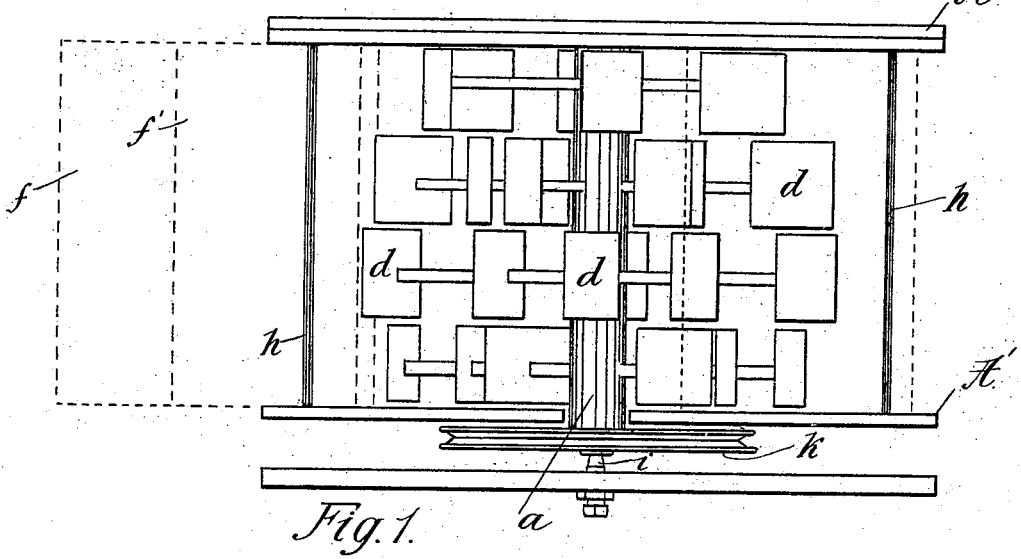
Figure 2:
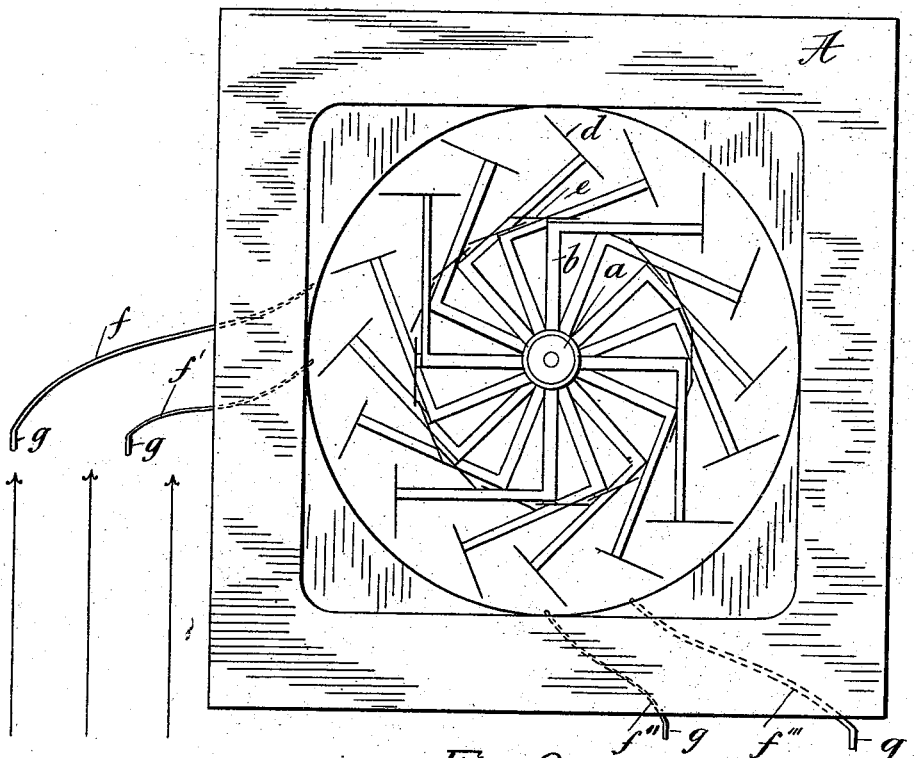
Figure 3:
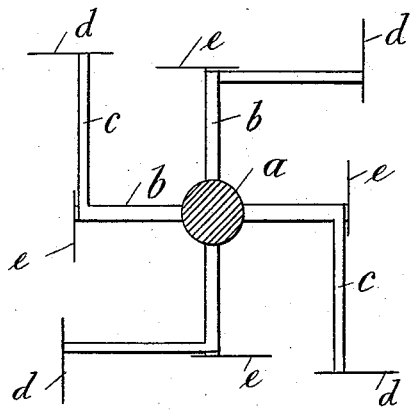
Figure 4:
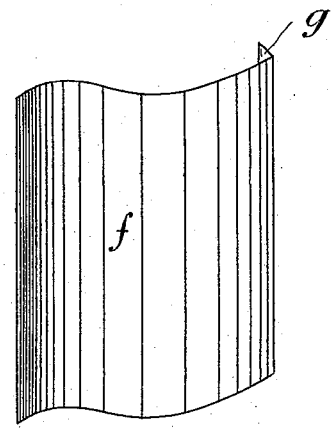

Figure 1 shows a side view, partly in section, of the turbine. Fig. 2 is a plan view; Fig. 3, a set of wings; Fig. 4, a plate for catching or conducting the wind.

In the frame A A', which is stiffened by the braces $h$, the shaft $a$ is arranged vertically between the points $i$, or in other position. This shaft $a$ carries sets of wings arranged in a circle in several rows, one above the other. Each of these sets of wings consists, as shown in Fig. 3, of four radial bars $b$ fastened to the shaft $a$, from the ends of which bars $b$ the bars $c$ run off tangentially at the same inclination in knee form.

At the place of junction of the bars $b$ and $c$ the wings $e$ are arranged tangentially to the shaft $a$, and the wings $d$ in the same way at the ends of the bars $c$. By this arrangement eight wings are carried by four arms. The sets of wings above described are arranged, according to their number, at equal distances upon the shaft in such manner that the star-like position of the radial arms $b$, as shown in Fig. 2, is formed. By this means a steady revolution of the shaft is attained, which with any other arrangement of the arms would revolve more or less by jerks.

In order to produce any revolution at all by the wind this must only strike one-half of the sets of wings, lying one above the other, because otherwise the forces would be mutually counterbalanced. With the wind in the direction shown by the arrows in Fig. 2, the wind must only be led in on the left or right of the center point of the shaft. The volume of wind is therefore limited from the first. Nevertheless, in order to conduct a very great volume of wind into the turbine, plates or blades $f\ f'\ f^2\ f^3$ are arranged, as shown in Fig. 2, for catching or conducting the wind. These plates are bent in the form of an S, and have also a turn-over piece $g$, so that they catch the wind and conduct it into the turbine, where under high pressure it operates the wings. At the lower end of the shaft $a$ is a driving-pulley $k$, by which the power is further transmitted.

For regulating the turbine, plates (not shown on the drawings) may be placed between the walls of the frame A, which plates limit the exit of the wind. A portion of the plates for catching the wind can also be removed when the wind is too strong. The number of the arms $b$ lying in one plane may be any desired.

What I claim is—

In a wind turbine, the combination of the shaft $a$ carrying the knee shaped arms $b$, $c$, the said arms being placed in sets at equal distances along the shaft and in each set at equal distances around the shaft, of the wings $e$ and $d$ placed at the knees and ends of the arms and the S-shaped plates $f\ f'\ f^2\ f^3$ to conduct the wind against the sails, substantially as described.

JOHANN FIMMEN JANSSEN.

Witnesses:
   CARL SCHARFF,
   JOHANN HINRICHS.